Figure 1:
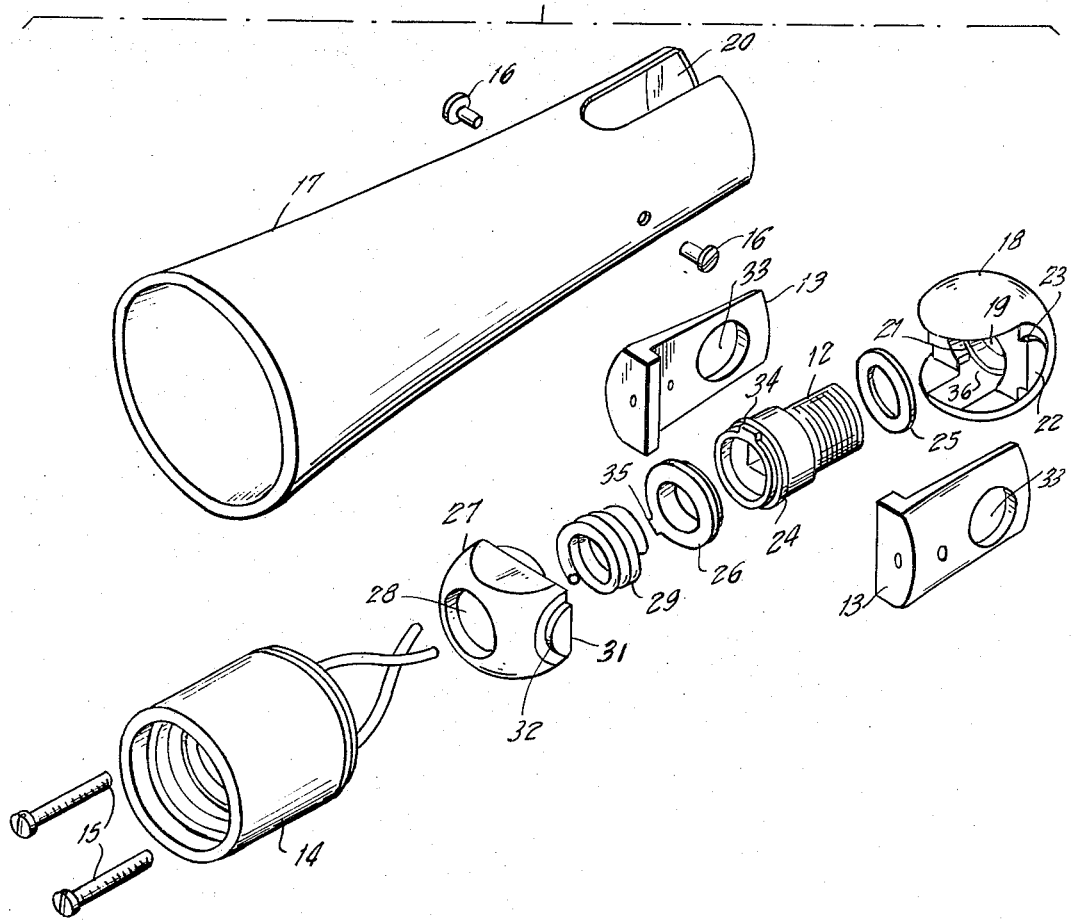

Sept. 12, 1967     L. WICHERS     3,341,230
SWIVEL UNIT
Filed Oct. 23, 1965

INVENTOR.
LOUIS WICHERS
BY
OSTROLENK, FABER, GERB & SOFFEN
ATTORNEYS ns 3,341,230
SWIVEL UNIT
Louis Wichers, Nyack, N.Y., assignor to Swivelier Company, Inc., Nanuet, N.Y., a corporation of New York
Filed Oct. 23, 1965, Ser. No. 502,983
7 Claims. (Cl. 285—266)

This invention relates to an improved swivel unit, and more particularly to such a unit which, while preferably utilized in lighting fixtures, may also be utilized wherever an adjustable supporting member is desired, e.g., for workholders, adjustable supports, microphone stands, adjustable mirrors, or the like.

Heretofore proposed spring-loaded swivel assemblies have incorporated spring-biased ball assemblies which are, in turn, spring-loaded within outer shell members for pivotal movement with respect thereto. Such devices are described, for example, in prior Patents 2,925,294 and 3,122,331, assigned to the owner of the present invention. Alternatively in lieu of the conventional coil spring of the ball assembly, a Belleville type washer spring may be utilized as described, for example in U.S. Patent 3,022,096, which is also owned by the assignee of the present invention.

It is among the objects of the present invention to provide an improved swivel unit which, as compared with previously known spring-loaded swivel assemblies, such as described in the aforesaid patents, is manifestly simpler in structure, may be manufactured with a minimum of parts, tooling and assembly apparatus, and may be readily assembled or disassembled as desired.

A further object of the invention is to provide such a swivel unit which may be utilized to impart both angular and rotational movements of the devices to be supported thereby, with calculable and variable means of imposing any desired frictional loads to such movements.

Yet a further object of the invention is to provide such a swivel unit, the size and configuration of which is subject to much greater variation in accordance with the particular application therefor than possible with heretofore known spring-loaded swivel assemblies.

Other objects and advantages of the present invention will appear in part hereinafter.

The improved and simplified swivel unit of the present invention incorporates a ball assembly defined by a pair of independent ball segments, a nipple, one end of which is received within such ball assembly and which is pivotally mounted about its longitudinal axis relative thereto, a single spring element biasing the respective ball segments away from one another, and a retainer element pivotally secured to the ball segments for maintaining the same in assembled relation. The retainer element may be fixedly secured to an outer shell or other member to thereby facilitate both pivotal movement of the ball assembly relative to the retainer and pivotal movement of the nipple about its axis, relative to the ball assembly. Thus both angular and rotational movement may be provided by the improved swivel structure without, however, the provision of any spring-loading of the ball assembly with respect to an outer shell member, as heretofore suggested.

It will be understood that the elimination of spring-loading of the ball assembly within an external shell markedly reduces the number of elements of the overall swivel unit, concurrently reducing the variables which may affect the performance, reliability and quality of such unit and thereby insuring a more reliable, longer lasting and better product for the ultimate consumer. Thus, since the ball assembly of the swivel unit of the present invention is not frictionally maintained against a spherical seating surface provided in an external shell or shade structure, it may be painted, the paint not being abraded due to subsequent friction. Similarly, chrome plating of the ball assembly need not be effected, since the surface thereof will not be subjected to gouging or marring.

It will be apparent, from a consideration of the following description of a preferred embodiment of the invention, that the swivel unit hereof is a self-contained assembly which is so designed as to remain intact solely as a result of the forces produced by the compression spring, the tapered design elements, and the frictional fits of the various components described hereinafter. Such unit will nevertheless maintain its integrity and not come apart even after long periods of use. Moreover, the relatively simple and compact swivel unit structure may be readily angularly or rotationally adjusted without the concurrent "chatter" and "squealing" to which many previously known swivel units have been subject.

Figure 2:
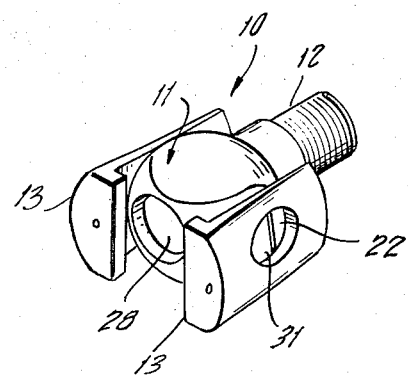

The nature and objects of the invention may best be considered in connection with the accompanying drawing illustrating a preferred form of the swivel unit hereof, in which:

FIGURE 1 is an exploded view of the swivel unit, as it might be incorporated in an electrical lighting fixture; and FIGURE 2 is a perspective view of the swivel unit in its assembled relation.

Turning to the drawings, the swivel unit 10 hereof comprises a ball assembly 11, a nipple 12, one end of which is received in the ball assembly and which is pivotally mounted about its longitudinal axis relative thereto, and a pair of retainers or trunnions 13 which are pivotally secured to the ball assembly and which maintain the swivel unit in assembled relation. When utilized as a support for an electrical lighting fixture, the swivel unit may be secured to a light socket 14 as by screws 15, which may engage mating apertures in the swivel unit trunnions 13. Such composite assembly may be pre-assembled, wired and tested and thereafter attached by any suitable means, e.g., buttonhead screws 16, to a lampholder 17 or any other desired shade, shell or other decorative element. A cut-out 20 is provided in the lampholder, limiting relative angular movement between the nipple 12 and the holder to approximately 90 degrees, as discussed more fully hereinafter. It will be apparent that the possibility of pre-assembly of the swivel unit imparts additional flexibility to the manufacturer's operations and facilitates increased interchangeability of components.

The ball assembly 11, as best shown in FIGURE 1, incorporates a first hollow ball segment 18 having an aperture 19 extending therethrough, through which the nipple 12 extends. A circumferential seat 21 is provided within ball segment 18, extending inwardly from the inner wall thereof. Formed on the opposing outer faces of the ball segment are a pair of outwardly projecting elements 22, each of which has a generally hemi-cylindrical shape and includes an outwardly tapering cylindrical surface 23.

The end of nipple 12 received within ball segment 18 is desirably shouldered, as at 24, to engage the circumferential seat 21 on segment 18 and thereby limit movement of the nipple 21 outwardly of such ball segment. Desirably, a bearing washer 25 is first placed on the circumferential seat 21 prior to seating the shouldered nipple end thereon. A ring member or collar 26 is additionally mounted within the ball segment 18 adjacent the end of nipple 12, for purposes more fully described below.

A second hollow ball segment 27 having an outer configuration generally mating with ball segment 18 and having an aperture 28 therethrough is provided to complete the ball assembly. A second circumferential seat extending inwardly from the inner wall of ball segment 27 is provided for seating a spring 29, interposed between the second ball segment and collar 26. Spring 29 biases collar 26, nipple 12, bearing washer 25, and ball segments 18 and 27 outwardly, when the swivel unit is maintained in assembled relation. A second pair of outwardly projecting elements 31 are formed on the opposing outer faces of ball segment 27, each such element adapted to abut the corresponding element 22 formed on ball segment 18 and having a generally hemi-cylindrical shape including an outwardly tapering cylindrical surface 32.

The ball assembly is maintained in assembled relation, against the force of spring 29, by retaining elements or trunnions 13. Each such element has an aperture 33 for receiving the corresponding elements 22 and 31 of the pair of ball segments. Apertures 33 are generally frustoconically shaped for engaging the outwardly tapering surfaces of elements 22 and 31, with such surfaces mating with and biased against the frustoconical aperture walls. Since the ball segments are biased outwardly by the force of spring 29 the projecting elements are thus firmly and securely retained in assembled relation by the trunnions.

Preferably, the swivel unit of the present invention is provided with a full turn mechanism similar to that described in the aforesaid U.S. Patent 3,022,096. Such mechanism, described hereinafter, facilitates limiting rotation of nipple 12 about its longitudinal axis to exactly 360 degrees.

The full turn stop mechanism includes a lug 34 extending from the shoulder 24 of nipple 12 and a stop lug 35 formed on collar 26, which latter lug is positioned for engagement by the nipple lug and is partially disposed within a stop slot 36 provided in first ball segment 18. The stop slot is longitudinally spaced from the circumferential seat 21 in ball segment 18 and is as wide as the width of the nipple lug 34 plus twice the width of the stop lug 35 formed on collar 26. The stop lug and the nipple lug thus cooperate with the stop slot to permit rotation of nipple 12 relative to ball segment 18 for a full revolution, preventing further rotation therebetween.

It may thus be seen that, in the preferred embodiment illustrated, angular movement between the swivel unit 10 and the shell 17 in which it is incorporated is restricted to approximately 90 degrees, whereas a full 360 degree rotational movement of the ball assembly (and the outer shell secured thereto) relative to nipple 12 is provided.

It should be emphasized that the present invention is not restricted to swivel units capable of 90 degree angular and 360 degree rotational movements, such as provided by the preferred embodiment described hereinabove. The degree of angular movement of the swivel unit is limited only by the dimensions of cutout 20 provided in shell or shade 17 in which the unit is housed. Similarly, the degree of rotational movement is limited only by the width of stop elements 35 and 36 provided on the full turn segment or collar 26 and ball segment 18. Thus the degree of angular and rotational movements described by the swivel unit may conveniently be increased or decreased, as may be required.

The swivel unit of the invention may, as illustrated in the preferred embodiment hereof, be conveniently utilized in connection with electrical lighting fixtures. It should, however, be understood that the swivel unit of the present invention may be utilized in adjustable supports for a wide variety of devices and are not, therefore, restricted to such use.

Since these and other changes may be made in the preferred embodiment described hereinabove without departing from the scope of the invention, it is intended that the preceding description and the accompanying drawings should be construed as illustrative and not in a limiting sense.

I claim:
1. A swivel unit, comprising
(a) a ball assembly defined by a pair of independent ball segments;
(b) a nipple, one end of which is received in said ball assembly and which is pivotally mounted about its longitudinal axis relative thereto;
(c) spring means biasing the ball segments away from one another;
(d) locking means formed integrally with each of said ball segments; and
(e) retaining means engaging said locking means for maintaining the ball segments in assembled relation, and being mounted for pivotal movement with respect thereto.

2. The swivel unit of claim 1, in which said locking means comprises a pair of outwardly projecting elements formed on each ball segment, and in which said retaining means comprises apertured trunnion means, the corresponding outwardly projecting elements on each ball segment being received in mating apertures of said trunnion means and engaging the trunnion walls defining such apertures.

3. The swivel unit of claim 1, in which said ball assembly comprises:
(1) a first hollow ball segment having an aperture extending therethrough;
(2) a first pair of outwardly projecting elements formed on opposing outer faces of said first ball segment, each said element having a generally hemi-cylindrical shape and including a generally frustoconical surface;
(3) a circumferential seat extending inwardly from the inner wall of said first ball segment,
(4) a second hollow ball segment mating with said first segment,
(5) a second circumferential seat extending inwardly from the inner wall of said second ball segment,
(6) a second pair of outwardly projecting elements formed on opposing outer faces of said second ball segment, each said element having a generally hemi-cylindrical shape and including a generally frustoconical surface;
corresponding elements of said first and second pairs of projecting elements being adapted to abut one another to define said locking means; and
(7) apertured trunnion means defining said retaining means, the surfaces of the apertures in said trunnion means being generally frustoconically shaped for receiving and engaging said projecting elements and thereby maintaining the ball segments in assembled relation with the trunnion means pivotally secured thereto.

4. The swivel unit of claim 2, in which each of said outwardly projecting elements has a generally hemi-cylindrical shape and includes cylindrical walls which taper outwardly from the adjacent face of the ball segment to the face of the element, and in which the mating apertures in said trunnion means are generally frustoconically shaped for receiving and engaging the adjacent hemi-cylindrical projecting elements formed on each of said segments, with the outward surfaces of said elements mating with and biased against the frustoconical walls defining each said aperture.

5. A fixture incorporating the swivel unit of claim 2, in which said unit is housed within an outer shell with said nipple extending through a slot provided in such shell, the dimensions of such slot being such as to permit relative pivotal movement between the shell and the nipple of substantially 90 degrees with respect to an axis normal to the longitudinal axis of the shell.

6. The swivel unit of claim 2, in which said trunnion means comprises a pair of apertured trunnions.

7. The swivel unit of claim 3, in which
said nipple further includes a lug extending from the nipple shoulder; and
said ball assembly further comprises:
(g) a collar received intermediate said spring and said one nipple end;
(h) a stop lug formed on said collar, positioned for engagement by said nipple lug and being partially disposed within the stop slot defined hereinafter; and (i) a stop slot defined in the inner wall of said first ball segment longitudinally spaced from the circumferential seat formed therein and being at least as wide as the width of said nipple lug plus twice the width of said stop lug, the stop lug and the nipple lug cooperating with said stop slot to permit rotation of the nipple relative to the first ball segment for a full revolution and preventing further rotation therebetween.

References Cited

UNITED STATES PATENTS 2,545,406  3/1951  Friend _____ 287—21

FOREIGN PATENTS 743,641  12/1943  Germany.

CARL W. TOMLIN, *Primary Examiner.*

THOMAS F. CALLAGHAN, *Examiner.*